July 1, 1969  A. C. SCINTA  3,452,384
WINDOW WIPER

Filed June 22, 1967  Sheet 1 of 2

INVENTOR.
ANTHONY C. SCINTA
BY E. Herbert Liss
ATTORNEY.

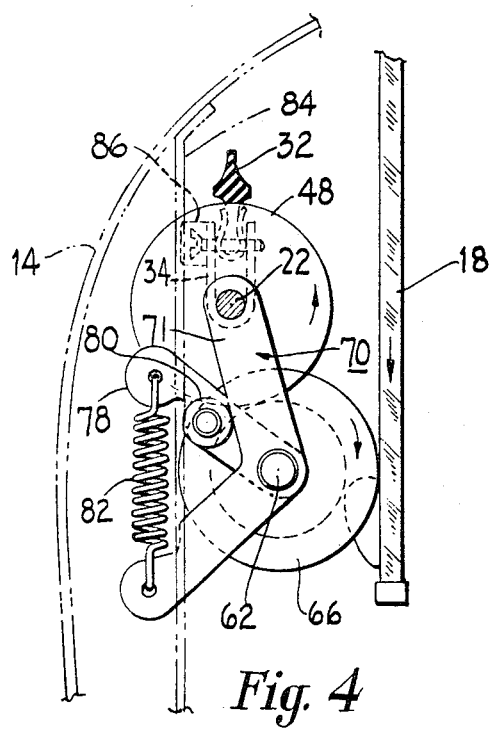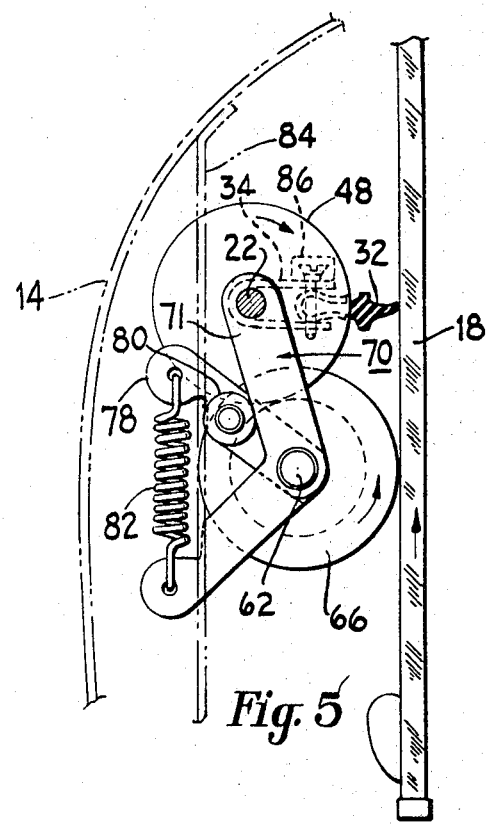

United States Patent Office 3,452,384
Patented July 1, 1969

3,452,384
WINDOW WIPER
Anthony C. Scinta, Hamburg, N.Y., assignor to Trico Products Corporation, Buffalo, N.Y.
Filed June 22, 1967, Ser. No. 648,093
Int. Cl. B60s 1/58, 1/34, 1/44
U.S. Cl. 15—250.1        7 Claims

ABSTRACT OF THE DISCLOSURE

Window wiping construction having a window wiping element mounted on a horizonally disposed rotatable bar located between the inner and outer panels of a vehicle door. A friction roller transmission incorporating an overload type slip clutch to limit the torque on the rotatable bar. The transmission is powered by frictional engagement with a linearily reciprocating window.

BACKGROUND OF THE INVENTION

The present invention relates to windshield wipers and, more particularly, to a windshield wiper for wiping reciprocating windows on vehicles such as tailgate windows in station wagons and side windows wherein the wiper remains stationary during the wiping cycle and the window moves relative to the blade with the blade in position against the window.

A window wiper of this type presents a unique problem in that it must be restricted to wiping only in one direction of window movement to avoid projecting moisture of the interior of the vehicle. If the wiper wipes during the opening operation of the window, the moisture will be propelled to the interior of the vehicle. There is also an optimum blade pressure required to achieve proper cleaning of the window.

SUMMARY

A wiper blade assembly is mounted on a horizontally arranged rotatable bar for rotation therewith. The bar is connected through a roller type transmission mechanism incorporating a slip clutch. The transmission is powered by the reciprocation of the window and is so arranged as to convert reciprocating motion of the window to rotary motion of the bar to which the wiper blade is attached. When the window is moved in one direction, the bar rotates in one sense and when the window is moved in the opposite direction, the wiper rotates in the opposite sense. For example, on the rear window of the tailgate structure in a station wagon, the wiper blade will rotate to a position away from the window upon downward movement of the window and will rotate to a position lying against the window on the upward stroke. This unique structure thereby avoids the problem discussed hereinabove in that it wipes only in the closing direction of the window.

The novel slip clutch arrangement provides optimum blade pressure. When the blade is pivoted against the window with proper pressure, the slip clutch prevents application of additional torque to the rotatable bar thereby limiting the blade pressure to the optimum value.

The principal object of the present invention is to provide an improved window wiper for linearly reciprocating windows of motor vehicles which is capable of moving to wiping position in one direction of window movement and out of wiping position in response to movement of the window in an opening direction.

Another object of the invention is to provide an improved stationary window wiper for linearly reciprocating windows of motor vehicles which is capacle of moving into and out of wiping position wherein blade pressure is adjustable and can be operated at optimum blade pressure.

Other objects and advantages of the invention will be apparent from the detailed description taken in connection with the accompanying drawings.

BRIEF DESCRIPITON OF THE DRAWINGS

Figure 1:
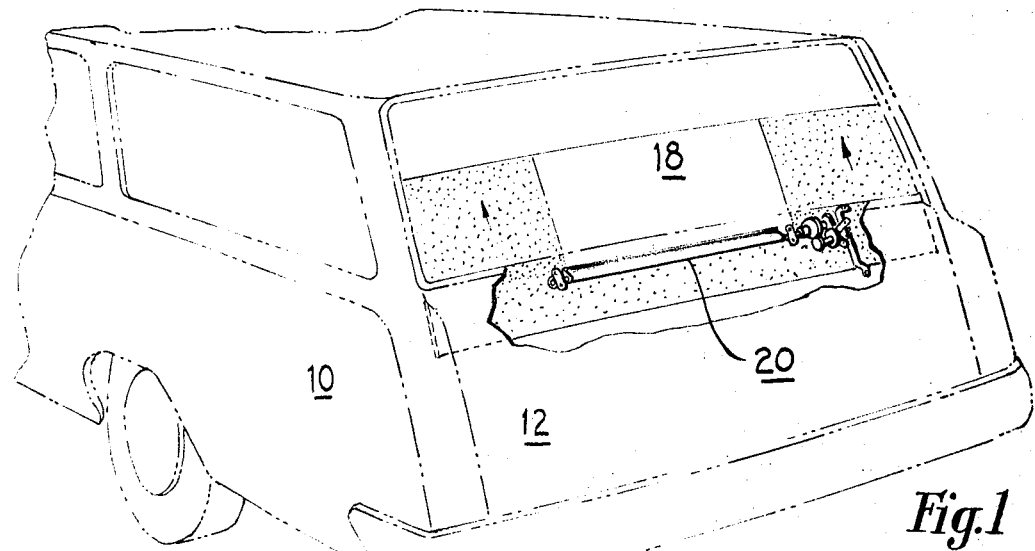
Figure 2:
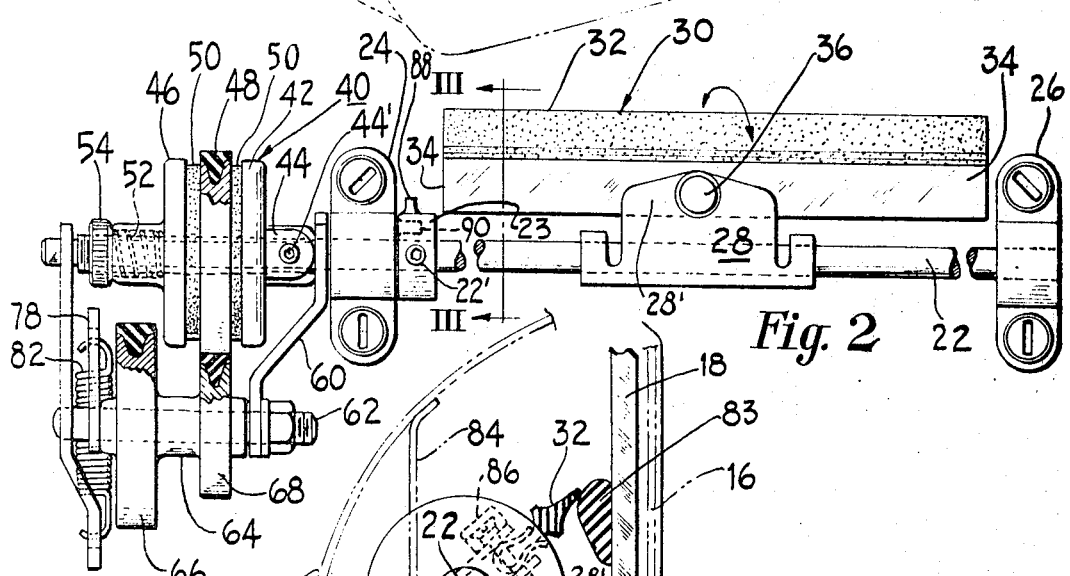
Figure 3:
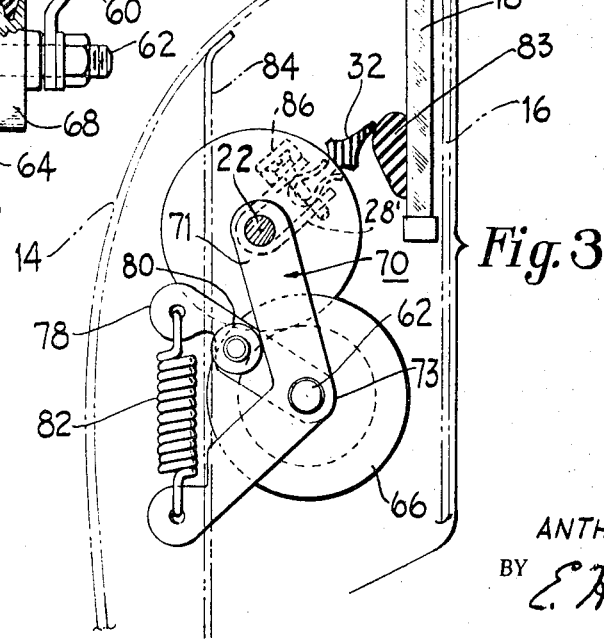

FIG. 1 is a partial perspective view of a station wagon type motor vehicle embodying the present invention;
FIG. 2 is an elevational view;
FIG. 3 is a sectional view taken on line III—III of FIG. 2 looking in the direction of the arrows, showing the mechanism in a rest position;
FIG. 4 is a sectional view similar to FIG. 3 illustrating the mechanism of the invention when the window is moved downwardly; and
FIG. 5 is a view similar to FIGS. 3 and 4 showing the mechanism of the invention when the window is moving upwardly.

DESCRIPTION OF THE PREFERRED EMBODIMENTS

In FIG. 1 there is shown a station wagon type motor vehicle 10 having a tailgate 12 with an outer wall structure 14 and an inner wall structure 16 forming a housing for receiving a reciprocating window 18 and also for mounting the wiping assembly 20 in a concealed position therein. Mechanism (not shown) either manual type or motor operated, is provided to permit the operator to move the window 18 upwardly to a closed position or downwardly into the tailgate structure 12 to an open position.

The wiping mechanism 20 comprises a rotatable blade supporting rod 22 journaled in suitable brackets 24 and 26 for rotation. The brackets 24 and 26 may be suitably mounted on the outer wall 14 of the tailgate 12 horizontally spaced apart to accommodate the blade holding rod 22 in a horizontal position. A retaining collar 23 is secured to the rod 22 as by a set screw 22' to retain the rod 22 against horizontal movement relative to the brackets 24 and 26. A blade clip 28 is secured to the rod 22 and includes a pair of ears 28' for receiving a wiping blade 30. The wiping blade 30 includes a wiping element 32 of rubber or other suitable material and a superstructure 34 of any suitable or desirable construction. The wiping element 32 is secured to the superstructure 34 in a suitable manner. The superstructure is secured between the ears 28' in any suitable or desirable manner as, for example, by a rivet as shown at 36.

A roller assembly or slip clutch 40 is mounted adjacent one end of the blade holding rod 22 and includes a clutch plate 42 rigidly secured to the bar 22 as by a sleeve 44 and set screw 44'. A second clutch plate 46 is slidably mounted on the bar 22 and a roller 48 is disposed intermediate the first and second clutch plates 42 and 46, respectively. The periphery of the roller may be of rubber or other suitable or desirable material having a high coefficient of friction. Clutch facing 50 is disposed intermediate the first clutch plate 42 and the roller 48 and between the second clutch plate 46 and the roller 48. A compression spring 52 may be provided on the rod 22 adjacent the outer surface of the clutch plate 46 and an adjusting nut 54 may be threadably disposed on the rod 22 to provide ajustable biasing pressure for compressing the roller 48 between the clutch faces 50. The nut 54 is ajusted so that at a selected torque load, the roller 48 will rotate relative to the clutch faces 50 and at torques lower than the selected value, the clutch plates 42 and 46 will rotate with the roller 48 to, in turn, effect rotation of the rod 22 and the blade 30. Mounted on the rod 22 is a bracket 60 for journaling a roller shaft 62 on an axis parallel to the axis of the rod 22. A roller assembly 64 is rotatably received on shaft 62 and comprises a first roller 66 and a second roller 68 rigidly secured together. The periphery of the rollers 66 and 68 are both high friction surfaces. The roller 68 is positioned to frictionally engage roller 48 to effect rotation of roller 48. Roller 66 is positioned and of such diameter as to frictionally engage the surface of window 18. A bellcrank lever 70 is provided having the free end of one leg 71 thereof rotatably mounted on the rod 22 and the apex 73 thereof rotatably mounted on shaft 62. A lever 78 is provided having one end thereof rotatably mounted on shaft 62 in a plane closely adjacent the plane of the bellcrank level 70. A tension spring 82 is provided and is secured at its opposite ends to the free ends of bellcrank lever 70 and lever 78, respectively. A guide track 84 is mounted on the outer wall 14 of the tailgate in a position to engage a guide roller 80 mounted on level 78 intermediate its ends to bias the roller 66 against the window 18 in response to tension in spring 82.

The mechanism is shown in its rest position in FIG. 3. The tailgate window 18 employs either manual or motor operated mechanism (not shown) for moving the window up or down. When the window 18 is moved downwardly, it frictionally engages roller 66. The spring 82 biases the axis of roller 66 toward the window, applying sufficient force to make good roller contact. The roller 66 moves clockwise causing the roller 68 to move clockwise therewith. Roller 68 frictionally engages roller 48 causing roller 48 to turn counterclockwise, thereby moving the wiping element 32 away from the window to the position seen in FIG. 4. A stop 86 is secured to the blade superstructure 34 positioned to engage guide track 84 to thereby limit counterclockwise rotation of the blade 30.

When the window 18 is moved upwardly, the roller 68 is turned counterclockwise along with roller 66, causing the roller 48 to move clockwise to the FIG. 5 position. The wiping element 32 then engages the window 18 to produce to wipe. The proper wiping pressure is maintained by the slip clutch arrangement of roller 48. The load produced by the engagement of the wiper 32 against the window causes the roller 48 to slip between the clutch surfaces 50, thus preventing further pivoting of the wiping element 32. The adjusting nut 54 and spring 52 are so adjusted as to permit the optimum wiping pressure required to properly clean the window. A stop pin 88 is provided on retaining collar 23 positioned to engage a stop lug 90 on bracket 24. This stop pin 88 and lug 90 insure limitation of counterclockwise movement of blade 30 should extraneous conditions interfere with proper slipping action of the clutch.

When the window approaches its uppermost closed position, the bumper 83 at the base of the window 18 engages the wiper 32. The roller 66 having left the window at this point relieves the roller 48 of any load. The bumper 83 then cams the wiper element 32 in a counterclockwise direction and the spring tension on spring 82 causes the axis 62 to move to the outermost position shown in FIG. 3 which in turn moves the roller 66 away from the window. Thus, there is no load on the roller 48 when the next window opening operation occurs and it can freely turn to the inoperative position during the next window opening operation.

A unique window wiper has been shown and described which is especially adaptable to use in tailgate windows for station wagons, but may be utilized for any window which reciprocates in a linear path from open to closed position and vice versa. Means are provided for applying the optimum pressure of the wiping element against the windshield and for wiping in only one direction which is, of course, an essential requirement. A specific embodiment of the invention has been described for the purposes of illustration, but it will be apparent that various modifications and other embodiments are possible within the scope of the invention. It is to be understood therefore that the invention is not limited to the specific arrangement shown, but in its broadest aspects it includes all equivalent embodiments and modifications which come within the scope of the invention.

What is claimed is:

1. A window wiper for motor vehicles comprising a wiping mechanism for rotation about a fixed axis adjacent a movable window, transmission means responsive to movement of the window for converting linear motion of said window to pivotal motion of said wiper element, said transmission means including a first roller assembly for frictionally engaging said window and rotatable in response to linear window movement to effect pivoting of said wiper element in one direction to a wiping position in engagement with said window in response to movement of said window in a first direction and for effecting pivoting of said wiper element in the direction opposite said one direction to a position out of engagement with said window in response to movement of said window in a second direction, a second roller assembly driven by said first roller assembly drivingly connected to said wiper mechanism for effecting pivotal movement thereof and biasing means for effecting firm engagement between said window and said first roller assembly during movement of the window.

2. A window wiper for motor vehicles according to claim 1 wherein means are provided for controlling the pressure of the blade against the window when the blade is in a wiping position.

3. A window wiper for motor vehicles according to claim 1 wherein one of said first and second roller assemblies is drivingly connected to said wiper element through slip clutch means to thereby limit the torque applied to said wiping element, thus limiting the pressure of the blade against the window.

4. A window wiper for motor vehicles according to claim 2 wherein the means for controlling the pressure of the blade against the window is adjustable.

5. A window wiper for motor vehicles according to claim 1 wherein said first roller assembly is mounted for rotation on a floating axis and said biasing means includes spring and lever means acting on said first roller assembly for biasing said first roller assembly against the window.

6. A window wiper for motor vehicles according to claim 1 wherein said first and second roller assemblies are frictionally engaged with each other.

7. A window wiper for motor vehicles according to claim 6 wherein said slip clutch means includes a pair of opposed clutch plates on opposite sides of said second roller assembly spring means urging said second roller assembly and said clutch plates into operative frictional engagement and threaded clamping means for varying the spring compression.

References Cited

UNITED STATES PATENTS

| 1,633,479 | 6/1927 | Rosa | 15—250.1 XR |
| 1,877,440 | 9/1932 | Adatte. | |
| 2,666,941 | 1/1954 | Oishei | 15—250.1 |
| 2,743,472 | 5/1956 | Alef | 15—250.1 |
| 2,962,740 | 12/1960 | Plantholt | 15—41 |

PETER FELDMAN, *Primary Examiner.*

U.S. Cl. X.R.

15—250.2, 250.11, 103; 64—30